United States Patent Office 3,278,491
Patented Oct. 11, 1966

3,278,491
STABILIZED POLYCHLOROALDEHYDES AND
PROCESS OF PREPARING SAME
Irving Rosen, Painesville, Ohio, assignor to Diamond
Alkali Company, Cleveland, Ohio, a corporation of
Delaware
No Drawing. Filed Sept. 3, 1963, Ser. No. 306,296
24 Claims. (Cl. 260—67)

This application is a continuation-in-part of my copending application, Serial No. 189,266, filed April 23, 1962, now abandoned.

This invention relates to novel halogen-containing polymeric compositions and to the method for preparing these compositions. More particularly, this invention relates to the preparation of novel chloral polymer compositions which are highly resistant to thermal decomposition.

The terms "chloral polymer compositions," "chloral polymers," "polymeric materials" and like terms, as used herein in the specification and claims, are intended to refer to homopolymers of trichloroacetaldehyde monomer, commonly designated in the art as chloral, and to copolymers of chloral containing up to 70 mol percent of dichloroacetaldehyde, which copolymers have been described in pending application, Serial No. 300,094, filed August 5, 1963, in the names of Irving Rosen and George H. McCain. These terms are likewise intended to refer to copolymers of chloral in combination with up to 50 percent, by weight, of one or more suitable monomers copolymerizable therewith.

It has long been known that chloral may be rapidly converted to polymers of varying molecular weight by contacting this monomer under suitable conditions with a variety of familiar ionic polymerization catalysts, such as acids, bases, peroxides, and the like. As reported in Beilstein's Handbuch, vol. 1, page 618, for example, polychloral may be prepared by treating chloral or chloral hydrate with large amounts of concentrated sulfuric acid. Tertiary amines, e.g., pyridine and quinoline, may also convert chloral to a crystalline polymer according to methods outlined by J. Boeseken and A. Schimmel, Rec. trav. Chim., 1913, 32, pages 112–127, and by A. Novak and E. Whalley, Transactions of the Faraday Society, 55, pages 1490–1499. More recently, it has been found by Furukawa and co-workers, reporting in Makromolekulare Chemie, 44–46, pages 398–407, that crystalline polychloral may be prepared at very low temperatures by contacting the monomer with organometallic coordination catalysts such as butyl lithium, zinc diethyl, cadmium dialkyl and boron trialkyl.

Chloral polymers prepared by the aforementioned polymerization methods exhibit varying degrees of crystallinity, as indicated by their X-ray diffraction patterns. They have been shown by infrared analytical techniques to have a structure analogous to that of freshly prepared, unstabilized polyformaldehyde glycols. That is to say, such polymers are composed of recurring monomer units which are joined together in linear chains, terminated at both ends by unstable hydroxyl groups. Under suitable conditions, these unstable hydroxyl groups will dissociate and cause one or more monomer units at, or near the end of the polymer chain to break away. Thus, while it has been possible heretofore to prepare chloral polymer compositions of fairly high molecular weight, such materials generally have been thermally unstable, i.e., they have decomposed into their monomer units when subjected, in some instances, to even slightly elevated temperatures.

It can be easily recognized that chloral polymer compositions possess excellent fire-retardant properties because of their halogen content. It can be envisioned that such polymers, if possessing a high degree of thermal stability, would be useful articles of commerce capable of being fabricated at the elevated processing temperatures required to flame-retardant plastic articles, such as films, moldings, extrusions, and the like.

Methods which have been developed to stabilize oxymethylene polymers against thermal degradation are now well known in the art, being the subject of many issued U.S. patents and numerous technical publications. Efforts to stabilize the terminal hydroxyl groups of chloral polymer compositions, as defined herein, by processes similar to those used for polyformaldehydes have heretofore proved unsuccessful, especially those reactions effected under alkaline conditions. Being extremely sensitive to alkalies, chloral polymeric materials thus treated have decomposed so rapidly that little, if any, stabilized polymer has been produced. However, these polymers have shown a surprising stability to acids or acidic media, a property which is not possessed by formaldehyde polymers.

It is an object of this invention, therefore, to provide a means for stabilizing newly prepared chloral polymers and copolymers, as defined hereinabove, against any significant thermal degradation during processing operations.

It is another object of this invention to provide solid chloral polymer compositions having a high degree of thermal stability.

A further object of this invention is to provide heat-stabilized chloral polymer compositions which are resistant to attack by both acids and alkalies and exhibit a high degree of fire-retardance.

Still another object of this invention is to provide heat-stabilized, fire-retardant and chemically resistant chloral polymer compositions which may be processed into tough and durable plastic articles of commerce such as films, moldings, extrusions and the like.

These and other objects of this invention will become apparent to those skilled in the art by the description of the invention which follows.

The present invention involves reacting, under acid conditions, a chloral polymer composition having a number average molecular weight of at least 1500 and having hydroxyl groups located at the terminal positions of each polymer chain, with an acetylating or esterifying agent so that substantially all of the chain-end hydroxyls of the said polymeric material are converted to ester groups and the treated polymer recovered exhibits a high degree of thermal stability.

More specifically, the present invention embodies heat-stabilizing a chloral polymer composition having a number average molecular weight of at least 1500 but preferably, at least 6,000, by contacting it at temperatures within the range of 80° to 220° C. and under acid conditions or in the presence of acid catalysts, with either (1) and acid halide of either an aliphatic or aromatic mono- or polycarboxylic acid; or with (2) an anhydride of either the said aliphatic or aromatic mono- or polycarboxylic acid; said reaction being carried out until the terminal hydroxyl groups of the chloral polymer chains are esterified. The resulting "capped" polymers thereafter exhibit a high degree of thermal stability being not subject to substantial weight reduction, i.e., these polymers do not decompose when exposed to temperatures above 120° C., contrary to the significant or complete decomposition evidenced by similar but unstabilized chloral polymer compositions at these same temperatures. The polymers thus stabilized may thereafter be fabricated at required processing temperatures, producing useful plastic articles which are translucent to clear, tough, chemically resistant and fire-retardant.

As designated herein, the thermal stability of the polymer compositions of this invention is the value the representing the constant rate at which these materials degrade at an elevated temperature, at which degradation can be easily and accurately measured. Accordingly, the values of the reaction rate constant in this invention have been determined at 255° C. In the art it is common to designate chemical reactions as first-order, second-order, etc., depending upon the number of molecules which either enter into, or are formed in the reaction. Similarly, the reverse phenomenon, that is to say, the decomposition or breakdown of a material, following a first-order reaction, may mathematically be expressed by the differential equation:

$$-\frac{dw}{dt} = kw$$

wherein $t$ equals the time elasping from the beginning of the reaction, $w$ is the weight of the material which remains undecomposed at time $t$, and $k$ is a rate constant for the equation. In general, the chloral polymer compositions of this invention have evidenced a thermal degaradation which closely correlates a first-order reaction as expressed by the above equation. Thus, the $k$ value in the equation is used herein to characterize the thermal stability of the polymers of this invention.

These heat-stabilized polymeric materials are considered satisfactory if they have a value of $k$ for a thermal degradation reaction at 255° C. ($k_{255}$) of 1.6 percent per minute, or less; or, as stated in another manner, these polymers will lose 1.6 percent or less of their weight per minute while maintained at 255° C.

The value of the reaction rate constant for thermal degradation is measured herein by means of thermogravimetric analysis, using a Stanton Automatic Recording Thermobalance, High Temperature Model, having a platinum/rhodium bifilar wound furnace. For the test, 200 mg. of the polymer material is weighted into a 16 mm. x 20 mm. crucible, which is then placed on the platform of a movable heat-resistant cylinder rod which is connected to the balance mechanism. The furance of the instrument is preheated to the temperature at which the rate of thermal degradation is being determined, i.e., 255° C., and is saturated with an an inert gas such as nitrogen. When the furnace has reached the desired temperature and an inert atmosphere has been established therein, the polymer sample is introduced into the "hot band" of the furnace by moving the furnace downward into position. Thereafter, during the heat treatment, the temperature of the polymer sample being maintained, its decomposition as measured by loss in weight, and the time of the test in minutes is automatically recorded. After the test the decomposition rate is obtained by plotting, as the ordinate, the logarithm of the weight percent of the remaining undegraded polymer material versus the corresponding times of oven exposure. From these plotted values can be drawn a decomposition curve which indicates that the polymer composition degrades initially at a very fast rate after which degradation proceeds at a more constant, even rate throughout the major portion of the degradation period. This latter period characterizes the true nature of the polymer composition. The fast, spasmodic degradation exhibited by the polymer initially occurs for about the first five minutes of the degradation test. Accordingly, the reaction rate constant, $k$, for thermal degradation of the polymer compositions of this invention is selected from that portion of the degradation curve which represents the weight loss, or degradation of these materials after the initial, or first-order decomposition has started. The $k$ value is expresed as weight percent per minute.

Another means which is used herein to characterize the polymers of this invention is their comparative stability when exposed to the action of hot dimethylformamide. While unstabilized chloral polymer compositions decompose rapidly when contacted with this solvent heated to 130° C., the stabilized products of this invention show vastly improved resistance to decomposition when so exposed for extended periods of time. As herein reported, values designating polymer stability in hot dimethylformamide are determined by first weighing a 0.05 g. sample of the stabilized polymer material into a small test tube, adding thereto a sufficient quantity of dimethylformamide to cover said polymer and then heating the mixture for at least 30 minutes in an oil bath. At the end of the heating period the mixture is allowed to cool, after which the solvent is removed from the polymer by repeated extractions with acetone. After each extraction the polymer is separated from the solvent-acetone fraction by centrifuging. The reclaimed polymer is then dried to constant weight in a vacuum oven at room temperature, after which it is again weighed and the percent of stable polymer remaining is calculated by difference. Using this procedure the stabilized compositions of this invention have shown up to 100 percent stability in dimethylformamide at 130° C., whereas no amount of unstabilized polymer can be recovered from the hot dimethylformamide treatment. Furthermore, efforts to reclaim unstabilized polymer from the solvent using a non-solvent as precipitant are unsuccessful, since the unstabilized material is decomposed, not merely dissolved, by the treatment.

Examination of the chemical structure of the polymer compositions of this invention by infrared analysis techniques has also been employed herein as another method whereby the degree to which these polymers are esterified is evaluated. Accordingly, the hydroxyl and ester carbonyl contents of the polymers are measured both before and after they have been esterified.

Techniques used to analyze materials by infrared spectroscopy are familiar to those skilled in the art and, as applied herein, are accomplished employing a Perkin-Elmer Model 21 spectrophotometer fitted with a calcium fluoride prism and operated, for all analyses, at a scanning rate of 2 minutes per micron. The polymer sample specimens used were prepared as mulls in heavy, white mineral oil (U.S.P.), using 0.04 g. polymer with 2 drops of oil. All analyses were made in the region of 2 to 9.5 microns wavelength, the hydroxyl band appearing at a wavelength of 2.88 microns, the ester carbonyl band at a wavelength of about 5.8 microns, and the ester group band appearing in the 8 microns wavelength region. Examination of the spectra obtained from the crude and the treated polymers shows that there is a strong hydroxyl band evidenced by the untreated polymers, which band is due to the presence of the hydroxyl groups terminating the chains of these materials. In the spectra of the stabilized polymers, however, this hydroxyl band cannot be detected or is very weak in instances where not all of the hydroxyl end groups of the crude polymer have been converted to ester groups during treatment. The spectra obtained for these treated polymers likewise show ester carbonyl bands and ester group bands of varying intensities, depending upon the degree to which these materials have been stabilized. These bands are lacking in the spectra of the unstabilized polymers.

As reported herein, the number average molecular weight of the polymers of this invention has been measured both by elemental analysis and by infrared absorption techniques. Elemental analysis methods have proven most accurate in characterizing lower molecular weight polymers, i.e., those polymers with number average molecular weights ranging as high as 12,000. Elemental chemical analysis, as applied in this invention, comprises first determining the carbon and hydrogen content of the polymer material prior to stabilization, and then determining the percentage of these elements in a sample of the same polymer which has been completely esterified, i.e., a polymer wherein all of the hydroxyl groups terminating the chains of said polymer have been converted to selected known ester groups. Subsequent comparison of the analytical results shows that the percentage of carbon and hydrogen present in the stabilized polymer is higher than that in the unstabilized material. Since the carbon and hydrogen content of any number of monomer units recurring in the polymer chain would yield the same analytical values for these elements, the increased percentage values for carbon and hydrogen obtained in the stabilized polymer are contributed by a certain number of ester end-groups incorporated therein. Using the different analytical results obtained and by a series of calculations, as will be shown hereinafter by a specific example, the number of monomer units recurring in the polymer chain and, thus, the number average molecular weight of the polymer may be derived.

In some instances, where it is desired to determine the number average molecular weight of those polymer compositions of this invention whose ends may not have been completely stabilized in the esterifying reaction, elemental analysis may nevertheless be employed. Values for carbon and hydrogen content of these materials can be corrected on the basis of the degree to which said polymers are stable in hot dimethylformamide.

Infrared analysis techniques, carried out according to the procedure outlined hereinbefore, have successfully been employed to determine the number average molecular weight of higher molecular weight chloral polymer materials stabilized by the process of this invention. This method comprises analyzing a sample of such unstabilized materials and then, as a standard, analyzing a sample of an unstabilized lower molecular weight polymer whose number average molecular weight has previously been determined by chemical analysis. The intensity of the hydroxyl band appearing in these two spectra are subsequently compared. Since the intensity of the hydroxyl band measured from the higher molecular weight material diminishes as the polymer molecule increases in size and the concentration of the hydroxyl-end groups in the polymer is thus diluted, the differences observed in the intensity between the hydroxyl bands present in the low and high molecular weight materials can be used to calculate the number average molecular weight of the heavier polymer. Using this procedure, average molecular weights of at least 45,000 have been determined for the treated polymers of this invention.

The chloral polymer composition which may be treated in the practice of this invention, being analogous to a polyformaldehyde glycol having a hydroxyl group located at the terminal ends of each polymer chain, may be represented broadly by the structure:

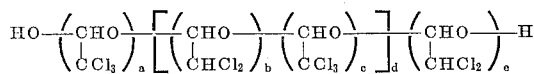

wherein $a$ and $c$ are each integers from 1 to 40, inclusive; $b$ and $e$ are each integers from 0 to 40, inclusive; and $d$ is an integer from 1 to 400, inclusive; with the proviso that when $b$ and $e$ are both zero, the sum of $a+(c \times d)$ is at least 10 and when at least one of $b$ and $e$ is greater than zero, the sum of $e+(b \times d)$ constituting up to 70 mol percent of the polymer composition, the sum of $$a+(b \times d)+(c \times d)+e$$

is at least 10.

By the process of this invention, the polymeric glycols represented by the above structure are converted to polymeric dicarboxylates which may be represented by the general structure:

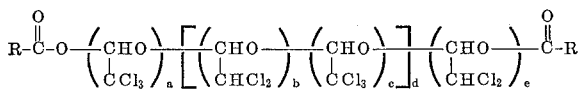

wherein R is selected from the group consisting of alkyl having from 1 to 11 carbon atoms, and aryl and ring-substituted aryl radicals; and $a$, $b$, $c$, $d$, and $e$ are each integers as defined above; with the proviso that when $b$ and $e$ are both zero, the sum of $a+(c \times d)$ is at least 10 and when at least one of $b$ and $e$ is greater than zero, the sum of $e+(b \times d)$ constituting up to 70 mol percent of the polymer composition, the sum of $$a+(b \times d)+(c \times d)+e$$

is at least 10.

The chloral polymer compositions treated in the process of this invention may be, as described previously, either homopolymers of chloral or copolymers thereof containing up to 70 mol percent of dichloroacetaldehyde. In the copolymer compositions, the recurring chloral units are interspersed with recurring dichloroacetaldehyde units. The comonomers can be present in the copolymer chain as comonomer blocks, i.e., some of the total number of units of one comonomer present in the copolymer are added sequentially in the copolymerization reaction with no units of the other comonomer incorporated between them.

In general, a chloral polymer composition having a number average molecular weight as low as 1500 advantageously may be subjected to end-group stabilization in the practice of this invention. Accordingly, in the representative structures of both the starting polymer material and the esterified product outlined above, the total number of monomer units in the polymer composition is designated as being at least 10.

However, chloral polymer compositions, which are thermally-stabilized by esterification in the preferred embodiments of this invention, are solid polymeric materials. Accordingly, when either of the representative structures outlined above are used to designate these untreated or stabilized solid products, the total number of monomer units is at least 40 in these compositions, which value indicates that the number average molecular weight of these materials is approximately 6,000.

As stated previously, the esterifying or acylating agents which advantageously may be employed under acid conditions herein to produce chloral polymeric carboxylate products of improved thermal stability are organic acid halides, i.e., aroyl and acyl halides, or the anhydrides of either aliphatic or aromatic mono- or polycarboxylic acids. Specifically, the halides are the acid halide derivatives of mono- and dicarboxy aromatic acids and those of aliphatic acids having from 2 to 12 carbon atoms per chain, with chlorides and bromides being the preferred acid halides. Additionally, aroyl halides containing substituents on the benzene ring, such as alkoxy, nitro or halogen radicals, may be employed effectively as esterifying agents in this invention. Exemplary acid halides which thus may be used are acetyl chloride, propionyl chloride, butyryl chloride, valeryl chloride, and the like; halide derivatives of unsubstituted and ring-substituted monocarboxylic aromatic acids, for example, benzoyl chloride, benzoyl bromide, o-methoxy benzoyl chloride, p-nitrobenzoyl chloride, and dichlorobenzoyl chloride; and halide derivatives of similar dicarboxylic acids, such as adipyl chloride and tere- and isophthaloyl chlorides.

The acid anhydrides which suitably may be employed are the anhydrides of aliphatic acids such as acetic, propionic, butyric, caproic, decanoic, stearic, cyclohexanecarboxylic, maleic, oleic, linoleic, succinic acids and the like, as well as aromatic acids, such as benzoic acid, phthalic acid and the like. Derivatives of the above acid anhydrides, such as alkyl- or aryl-substituted acid anhydrides and mixed anhydrides also may be employed. Usually, the non-olefinic acid anhydrides are preferred to the olefinic anhydrides and the most preferable anhydrides are those of alkanoic acids containing from 2 to 18 carbon atoms per molecule and having at least one hydrogen atom attached to the carbon which is bonded to the carbonyl in said acid. Acetic anhydride is especially desirable because of its availability and low cost. It should be noted, however, that these acid anhydrides are effective esterifying compounds only if employed under acid conditions, since chloral polymer materials as specified herein are degraded significantly by employing these anhydrides in alkaline media or with alkaline catalysts. In the process of this invention, the esterifying reaction may be carried out by any suitable means whereby the chloral polymer material being treated and the esterifying agent can be thoroughly contacted. Thus, suitable proportions of the polymer and the stabilizing compound which is liquid at the desired reaction temperature may be effectively contacted without using an auxiliary solvent, or suspending agent for the polymer. Additionally, benzoylation or acylation of the crude chloral polymer material may also be effected by contacting the esterifying compound, particularly an acid halide, with the polymer suspended in a finely-divided state in a suitable organic liquid in which it is not soluble, e.g., halogenated benzenes, such as monochlorobenzene, monobromobenzene, dichlorobenzene, or trichlorobenzene.

When employing the acid halides as the esterifying compound, it may be advantageous in some instances to contact the polymer in finely-divided, pulverulent form with heated vapors of the particular acid halide being used. By this method it is possible to esterify a higher percentage of polymer within a shorter reaction time, especially when lower-boiling acid halides such as those derived from lower alkanoic acids are used.

In carrying out the process of this invention temperatures ranging from about 80° to 220° C. and reaction times of about 10 minutes to 3 hours may generally be employed. As it is desirable, however, to accomplish esterification of the polymer within a minimum time period, for example, within 20 to 60 minutes, reaction temperatures of 100° to 200° C. are usually preferred.

With regard to the proportion of the ingredients used, it is important that a sufficient quantity of the acid halide or anhydride be used in proportion to the polymer material so that the esterification may be effected within a minimum reaction time. Accordingly, a ratio of about 1 to 14 parts esterifying compound by weight to one part polymer is generally employed in a liquid phase reaction wherein no auxiliary suspending agent is used. In a reaction wherein the polymer in suspension is treated with an acid halide it is possible to effect esterification efficiently with less excessive quantities of the esterifying agent. Thus, 1 to 7 parts acid halide by weight for every part of polymer may be sufficient. In a vapor-phase reaction wherein the dry polymer is treated by contact with heated vapors of the acid halide, as described hereinbefore, ratios as low as 0.2 part acid halide by weight per part of polymer may be effectively employed. If employed, the quantity of auxiliary liquid medium used is not critical although amounts ranging from 6 to 14 parts by weight for every part polymer are generally satisfactory.

The thermally-stabilized polymer compositions of this invention may be separated from the reaction mixture by filtration and thereafter purified by being thoroughly leached with reagent-miscible, but non-reactive solvents such as methanol, acetone, methyl ethyl ketone, ether, and the like. Additionally, in order to remove any quantities of unstable polymer that may be present therein, the purified product may be suspended for 5 to 15 minutes in a hot solvent such as 1,2,4-trichlorobenzene or dimethylformamide; or may be heated under an inert gaseous atmosphere at 255° C. for a similar period of time. However, this final processing step may or may not be preformed, as desired.

The chloral polymeric dicarboxylates of this invention are thermoplastic polymers having a number average molecular weight of at least 6,000 and a high degree of thermal stability. Since they exhibit no appreciable degradation when subjected to the elevated processing temperatures normally used in fabricating thermoplastic materials, these polymers advantageously may be employed to prepare useful plastic articles such as films, moldings, extrusions, and the like, which are translucent to clear, chemically-resistant and fire-retardant.

In addition to the solid polymeric products of this invention, it is also possible to prepare herein solid and semi-solid chloral polymeric dicarboxylates having a high degree of thermal stability. These materials, whose number average molecular weights may be as low as 1,000 to 1,500, may be easily prepared at an extremely low cost and may thus be employed advantageously as economical lubricants, wax-additives, plasticizers, pour-point depressants, etc., in a variety of cost-critical applications.

In order that those skilled in the art may better understand the present invention and the preferred methods by which it may be practiced, the following specific examples are offered.

*Example 1*

To a 100 ml., round-bottom flask is attached a vertical condenser fitted with a drying tube. Thirty ml. (36.4 g.) of benzoyl chloride is charged to the flask, after which there is added 8 g. of a chloral polymer which has been previously prepared by polymerizing chloral in the presence of sulfuric acid and thereafter washing the polymer obtained to remove acid residues. The benzoyl chloride-polychloral mixture is stirred by means of a magnetic stirrer for 30 minutes at room temperature. The agitating mixture is then heated and maintained at the reflux temperature of the benzoyl chloride (197° C.) for an additional 30 minutes, after which it is cooled and filtered. The treated polymer is then purified by being washed successively with acetone, diethyl ether and methanol, being slurried for at least 10 minutes in each liquid and being separated by filtration after each treatment. The washed polymer is then dried under vacuum at room temperature.

Infrared analysis of the treated polymer shows no evidence of any C—OH bands remaining unesterified, since there is no absorption in the spectrum corresponding to the hydroxyl band ($2.88\mu$). There are, however, strong bands appearing in the $5.8\mu$ and the $8.0\mu$ wave length regions, both bands indicating the presence of the benzoate carbonyl group in the polymer. When tested for the reaction rate constant for thermal degradation at 255° C., as described hereinbefore, the product of this example shows a rate of less than 0.05 percent per minute, as compared with a rate of 1.8 percent per minute shown by the untreated polymer. Treated in dimethylformamide at 130° C. for 30 minutes, the treated polymer is completely recovered whereas the unstabilized polymer decomposes completely under similar treatment and cannot be recovered.

Chemical analysis of the untreated chloral polymer, used to prepare the stabilized polymer, shows this material to contain 16.3 percent carbon and 0.69 percent hydrogen. By subsequent analysis of the treated polymer, values of 17.7 percent and 0.80 percent are obtained for its carbon and hydrogen content, respectively. The higher percentage of these elements obtained in the treated polymer, especially that for carbon, is attributed to the presence of the benzoate carbonyl groups terminating the polymer chain-ends. Since the treated polymer is completely esterified with no terminal hydroxyls remaining unconverted, as evidenced by its total recovery from hot dimethylformamide, it may be represented by the structure:

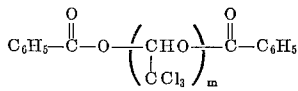

The number average molecular weight of the polymer is determined by calculating the weight of the polymer molecule, substituting different values of $m$, the recurring monomer unit, in the above structure and then computing the carbon and hydrogen percentage in each different polymer. These calculations show that a polychloral in which $m$ is 60 contains 17.7 percent carbon and 0.78 percent hydrogen, which percentages correlate closely the values obtained for these elements chemically. Thus, the chloral polymer stabilized in this example has a number average molecular weight of about 9,000.

*Example 2*

The end-group stabilization process is repeated as described in Example 1, with the exception that 15 ml. (19 g.) of o-methoxybenzoyl chloride is used in place of benzoyl chloride. Two grams of the unstabilized chloral polymer (as used in Example 1) is employed. After stirring the polymer-acid chloride mixture for 30 minutes at room temperature, the mixture is heated, with stirring, to 180° C., being then maintained at this temperature for an additional 30 minutes. The reactant mixture is then cooled, filtered, and the recovered polymer is washed with acetone, diethyl ether and methyl alcohol, as in Example 1. The polymer, vacuum-dried to constant weight, exhibits a reaction rate constant for thermal degradation of 0.05 percent per minute as compared to a rate of 1.8 percent per minute for the unstabilized polymer. Eighty percent of the polymer remains stable to hot dimethylformamide and is recovered. Similarly, there is no evidence, upon infrared analysis, that any C—OH groups remain in the stabilized polymer, but a strong ester band appears in the $8\mu$ wave length region of the spectrum.

*Example 3*

The stabilization process of Example 1 is repeated, using a 2-gram sample of the same unstabilized polychloral material. The esterifying agent of this example is 15 ml. (23.5 g.) of benzoyl bromide. The treated dried polymer product exhibits a rate constant for thermal decomposition ($k_{255}$) of 0.17 percent per minute, compared to the untreated polymer's rate constant of 1.8 percent per minute. Upon treatment at 130° C. for one-half hour in dimethylformamide, the polymer remains 74 percent stable. Infrared analysis indicates the absence of any significant number of C—OH groups in the stabilized polymer and shows strong carbonyl and ester group bands.

*Example 4*

In this example is treated a 2-gram portion of a chloral polymer with a number average molecular weight of around 45,000, said polymer having been previously prepared at −78° C., using a metallic organic coordination catalyst, according to the procedure outlined by J. Furukawa, T. Saegusa and H. Fujii in Makromolekulare Chemie, 44–46, pages 398–407. After polymerization, the recovered polymer was thoroughly washed with acid-base mixtures to remove any catalyst residues. The end-group stabilization process of Example 1 is followed with the exception that 20 ml. (25 g.) of o-methoxybenzoyl chloride is employed in place of benzoyl chloride. After the initial mixing procedure at room temperature, the reaction is conducted at 130° C. for 2 hours. The polymer product of the reaction is then purified and dried as in Example 1. This treated polymer exhibits a rate constant of thermal degradation at 255° C. of 1.2 percent per minute, whereas the unstabilized polymer degrades at a rate of 7.0 percent per minute. Likewise, the product of this example is 81 percent stable when treated in hot dimethylformamide as previously described herein. However, the unstabilized polymer is rapidly decomposed when so treated and cannot thereafter be recovered by precipitation from the dimethylformamide.

*Example 5*

The esterifying process used in this example is the same as that of Example 1, using 2 grams of the same polymer as that described in Example 1. In this example, 15 ml. (20.5 g.) of dichlorobenzoyl chloride is employed in place of benzoyl chloride. After being mixed at room temperature as in previous examples, the reaction mixture is heated to 180° C. and maintained at this temperature for 30 minutes. The treated polymer is then purified and dried as before. The reaction rate constant $k$, for thermal degradation, determined for this product, is 0.2 percent per minute at 255° C. When subjected to the hot dimethylformamide treatment, 76 percent of this product remains undecomposed.

*Example 6*

The esterifying procedure of Example 1 is repeated on 2 grams of the same polymer as that used in Example 1. In this example, 15 ml. (15.24 g.) of valeryl chloride is used instead of benzoyl chloride. The reaction is heated to the reflux temperature of the chloride (128° C.), and then continued at this temperature for 2 hours. The stabilized polymer, purified and dried as in previous examples, exhibits a first-order reaction rate constant, $k$, for thermal degradation of 0.35 percent per minute at 255° C. Sixty-eight percent of the polymer remains stable to the action of hot dimethylformamide.

*Example 7*

Using the same apparatus employed in previous examples, 2 grams of the polymer described in Example 1 is treated with 15 grams of p-nitrobenzoyl chloride. The reactants are placed in the flask, which is then positioned in an oil bath maintained at 180° C. After sufficient heat has been applied to melt the o-nitrobenzoyl chloride, agitation is applied to the reactant mixture. Heating and stirring of the reactants are then continued at 180° C. for a minimum of 30 minutes. The recovered treated polymer exhibits a reaction rate constant, $k$, for thermal degradation of 0.20 percent per minute at 280° C. When subjected to treatment in hot dimethylformamide, 65 percent of this polymer remains undecomposed.

*Example 8*

Into a thick-walled glass tube of 30 ml. capacity are placed 0.4 g. (0.005 mol) of acetyl chloride and a 2.0 g. portion of the chloral polymer described in Example 4, which polymer sample has previously been pulverized by at least two passes through a granulator (Wiley mill). The tube is then cooled in dry ice, evacuated, and heated in an oil bath at 130° C. for 2 hours. After cooling, the polymer is then removed from the tube and is purified and dried as in previous examples. Contacted with hot dimethylformamide for at least 30 minutes, the product of this example remains 95 percent undecomposed, indicating that the polymer has been almost completely esterified in this reaction wherein the polychloral is contacted with vaporous rather than liquid acetyl chloride.

In contrast to this efficient vapor-phase reaction, little stabilized polymer is obtained employing a reaction wherein the polymer, in the presence or absence of solvents or auxiliary suspending agents, is contacted with liquid acetyl chloride at the reflux temperature of the acetyl chloride (51° to 52° C.). Chloral polymers, treated in these reactions and then subsequently contacted with hot dimethylformamide, are shown to be only about 6 percent to 10 percent stabilized.

Example 9

This example illustrates the intolerance of polychloral to Lewis-base-type capping agents, such as are used to stabilize polyoxymethylene. Following the procedure of Example 1, 2.0 g. of the chloral polymer described in Example 1 is contacted with 15 ml. (16.44 g.) of phenylisocyanate, the reactants being heated at 100° C. for 30 minutes. The treated polymer is then purified and dried as in previous examples, with 35 percent of the starting polymer being recovered. Infrared analysis of the product shows a strong hydroxyl band in the 2.88μ wave length region, but no ester carbonyl or ester group bands. Likewise, the treated polymer decomposes completely when contacted with hot dimethylformamide; no heat-stabilized polymer is reclaimed.

Example 10

This example illustrates the instability of polychloral in alkaline reaction media, such as are used to stabilize polyoxymethylene. Following the procedure of Example 1, 2.0 g. of the chloral polymer of Example 1 is reacted with 15 ml. (16.23 g.) of acetic anhydride containing 0.05 g. of sodium acetate. After the initial mixing process, the reactant mixture is heated at 140° C. for 30 minutes. No significant amount of polymer is recovered from the reaction, indicating that the polychloral, being unstable under alkaline conditions, has decomposed.

Example 11

In this example, a 1-gram portion of the chloral polymer prepared, as described in Example 1, is treated with acetic anhydride. The polymer sample and 1 ml. (1.08 g.) of the anhydride are placed in a test tube which is then fitted with an inverted drying tube and heated at 140° C. in an oil bath for 35 minutes. After this heating period, the reaction mixture is cooled to room temperature and the polymer is separated and washed several times with methanol and methyl ethyl ketone. It is then dried under vacuum at room temperature. When treated in hot dimethylformamide as in the previous examples, the stabilized polychloral product of this example remains 80 percent stable. A polychloral sample similarly treated with acetic anhydride in the presence of pyridine remains only 22 percent stable when heated in dimehtylformamide for a similar time period.

Example 12

Using the apparatus employed in Example 1, 2 grams of polychloral prepared as described in Example 1 is mixed with 10 g. of butyric anhydride at room temperature for 30 minutes. The reaction mixture is then heated to 180° C. and maintained at this temperature for 30 minutes. After the heating period, the polymer is recovered, purified and dried as described in Example 1. The stabilized product remains 87 percent stable when tested in hot dimethylformamide.

Example 13

A high molecular weight copolymer containing 50 mol percent of chloral and 50 mol percent of dichloroacetaldehyde is prepared in an anhydrous toluene reaction medium, employing an anionic-type polymerization catalyst. After being purified with diethylether and dried to constant weight, 2 g. of the copolymer is mixed at room temperature with 20 g. lauroyl chloride, as described in previous examples. The resulting copolymer-lauroyl chloride mixture is heated in an oil bath at 180° C. for 35 minutes, and is then cooled to room temperature. The treated copolymer material is then separated, washed well with methanol and then with methyl ethyl ketone, and is dried under vacuum. This product remains 88 percent stable when heated in dimethylformamide at 130° C. for 30 minutes, whereas the untreated copolymer remains only 30 percent stable when similarly tested.

Example 14

A copolymer is prepared as described in Example 13 and contains 54 mol percent of chloral and 46 mol percent of dichloroacetaldehyde. This copolymer is stabilized as described in Example 13, employing 1.2 g. of the copolymer and 10 g. of acetic anhydride. The copolymer-anhydride mixture is heated in an oil bath at 140° C. for 40 minutes, after which the mixture is cooled and the treated copolymer material is separated, purified and dried as described above. This product remains 75 percent stable when treated in hot dimethylformamide, but the unstabilized copolymer is only 37 percent stable when so treated.

Example 15

A copolymer prepared as described in Example 13 and containing 38 mol percent of chloral and 62 mol percent of DCA is treated with acetic anhydride following the procedure as outlined in Examples 13 and 14 above. The stabilized copolymer obtained remains 66 percent stable when treated in hot dimethylformamide, while an unstabilized portion of the copolymer is only 32 percent stable when similarly treated.

It is to be understood that although the invention has been described with specific reference to particular embodiments thereof, it is not to be so limited, since changes and alterations therein may be made which are within the full intended scope of this invention as defined by the appended claims.

What is claimed is:

1. A thermally-stable chloral polymer composition exhibiting a reaction rate constant for thermal degradation at 255° C. of less than 1.6 percent, by weight, per minute, the said polymer composition having the general structure:

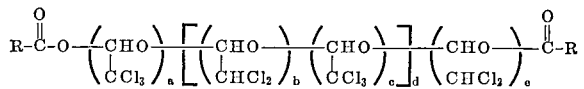

wherein each R is a hydrocarbon radical having 6 to 11 carbon atoms selected from the group consisting of aryl and substituted aryl; $a$ and $c$ are each integers from 1 to 40, inclusive; $b$ and $e$ are each integers from 0 to 40, inclusive; and $d$ is an integer from 1 to 400, inclusive; with the proviso that the sum of $a+(b \times d)+(c \times d)+e$ is at least 10, the sum of $e+(b \times d)$ constituting a maximum of 70 mol percent of the polymer composition.

2. The thermally-stable polymer composition of claim 1 which is a chloral homopolymer having a number average molecular weight in the range of about 6000 to about 45,000.

3. The thermally-stable polymer composition of claim 1 which is a copolymer containing recurring units derived from chloral monomer interspersed with recurring units derived from dichloroacetaldehyde monomer, said copolymer composition containing a maximum of 70 mol percent of the said dichloroacetaldehyde.

4. The thermally-stable polymer composition of claim 3 which contains from 40 to 60 mol percent of dichloroacetaldehyde.

5. A process for preparing a thermally-stable chloral polymer composition having the general structure:

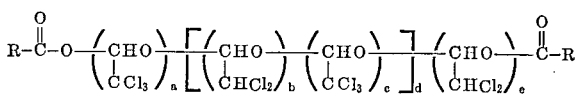

wherein each R is a hydrocarbon radical having 1 to 11 carbon atoms selected from the group consisting of alkyl, aryl and substituted aryl radicals; $a$ and $c$ are each integers from 1 to 40, inclusive; $b$ and $e$ are each integers from 0 to 40, inclusive; and $d$ is an integer from 1 to 400, inclusive; with the proviso that the sum of $a+(b \times d)+(c \times d)+e$ is at least 10, the sum of $e+(b \times d)$ constituting a maximum of 70 mol percent of the polymer composition; which process comprises reacting at a temperature of 80° to 220° C. and under acid conditions, a mixture consisting of a chloral polymeric glycol having a number average molecular weight in the range of about 6000 to about 45,000, and from 0.2 to 14 parts, by weight per part of the said chloral polymeric glycol, of an esterifying compound selected from the group consisting of halides of carboxylic acids containing 2 to 12 carbon atoms and anhydrides of carboxylic acids containing 2 to 18 carbon atoms; continuing the reaction until the terminal hydroxyls of the polymer chains have been substantially converted to organic ester groups, and thereafter recovering a chloral polymeric dicarboxylate having a reaction rate constant for thermal degradation at 255° C. of less than 1.6 percent by weight per minute.

6. The process of claim 5 wherein the solid chloral polymeric glycol in a finely-divided state is reacted with the said esterifying compound in liquid-phase.

7. A process for preparing a thermally-stable chloral polymer composition having the general structure

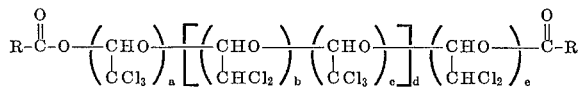

wherin each R is a hydrocarbon radical having 1 to 11 carbon atoms selected from the group consisting of alkyl, aryl and substituted aryl; $a$ and $e$ are each integers from 0 to 40, inclusive; and $d$ is an integer from 1 to 400, inclusive; with the proviso that the sum of $a+(b \times d)+(c \times d)+e$ is at least 10, the sum of $e+(b \times d)$ constituting a maximum of 70 mol percent of the polymer composition; which process comprises reacting at a temperature of 80° to 220° C. and under acid conditions, a finely-divided, pulverulent chloral polymeric glycol having a number average molecular weight ranging from about 6000 to about 45,000 with from 0.2 to 14 parts, by weight per part of the said chloral polymeric glycol, of a halide of an carboxylic acid containing 2 to 12 carbon atoms; continuing the reaction until the terminal hydroxyls of the polymer chains have been substantially converted to organic ester groups, and thereafter recovering a chloral polymeric dicarboxylate having a reaction rate constant for thermal degradation at 255° C. of less than 1.6 percent by weight per minute.

8. The process of claim 7 wherein the said chloral polymeric glycol is treated with the said acid halide while being suspended in a non-reactive organic liquid medium.

9. The process of claim 7 wherein the chloral polymeric glycol is reacted with the said acid halide in liquid-phase.

10. The process of claim 7 wherein the said chloral polymeric glycol is reacted with vapors of the said acid halide.

11. A process for preparing a thermally-stable chloral homopolymer which comprises reacting, at a temperature of 100° to 200° C. and under acid conditions a mixture consisting essentially of, a polychloral glycol having a number average molecular weight in the range of about 6000 to about 45,000 and from 0.2 to 14 parts by weight per part of polychloral glycol of an esterifying compound selected from the group consisting of halides of carboxylic acids containing 2 to 12 carbon atoms and anhydrides of carboxylic acids containing 2 to 18 carbon atoms; continuing the reaction until the terminal hydroxyls of the polymer chains have been substantially converted to ester groups, and thereafter recovering a polychloral dicarboxylate having a reaction rate constant for the thermal degradation of 255° C. of less than 1.6 percent by weight per minute.

12. The process of claim 11 wherein finely-divided, solid polychloral glycol is reacted with the said esterifying compound in liquid-phase.

13. A process for preparing a thermally-stable chloral homopolymer which comprises reacting at a temperature of 100° to 200° C. and under acid conditions, a finely-divided, pulverulent polychloral glycol having a number average molecular weight in the range of about 6000 to about 45,000 with from 0.2 to 14 parts, by weight, per part of said polychloral glycol of a halide of a carboxylic acid having 2 to 12 carbon atoms; continuing the reaction until the terminal hydroxyls of the polymer chains have been substantially converted to ester groups and thereafter recovering a polychloral dicarboxylate having a reaction rate constant for thermal degradation at 255° C. of less than 1.6 percent by weight per minute.

14. The process of claim 13 wherein the said polychloral glycol is treated with the said acid halide while being suspended in a non-reactive organic liquid medum.

15. The process of claim 13 wherein the organic acid halide used is benzoyl chloride and the thermally-stable chloral polymer prepared is a polychloral dibenzoate having a number average molecular weight in the range of about 6000 to about 45,000 and a reaction rate constant for thermal degradation at 255° C. of less than 1.6 percent by weight per minute.

16. The process of claim 13 wherein the organic acid halide used is acetyl chloride and the thermally-stable chloral polymer prepared in is a polychloral diacetate.

17. The process of claim 13 wherein the thermally-stable chloral polymer prepared is a polychloral dicarboxylate having a number average molecular weight of about 45,000.

18. The process of claim 13 wherein the polychloral glycol is reacted with the said acid halide in liquid-phase.

19. The process of claim 13 wherein the said polychloral glycol is reacted with vapors to the said acid halide.

20. The process of claim 13 wherein lauroyl chloride is used as the esterifying compound and the thermally-stable polymer composition prepared is a chloral-dichloroacetaldehyde copolymer dilaurate having a reaction rate constant for thermal degradation at 255° C. of less than 1.6 percent by weight per minute.

21. A process for preparing a thermally-stable chloral polymer composition comprising recurring units derived from chloral monomer interspersed with recurring units derived from dichloroacetaldehyde monomer, the said composition containing a maximum of 70 mol percent of dichloroacetaldehyde, which comprises reacting, at a temperature of 100° to 200° C. and under acid conditions a mixture consisting essentially of, the said chloral copolymer glycol having a number average molecular weight in the range of about 6000 to about 45,000 and from 0.2 to 14 parts by weight per part of the copolymer glycol of an esterifying compound selected from the group consisting of halides of carboxylic acids containing 2 to 12 carbon atoms and anhydrides of carboxylic acids containing to 2 to 18 carbon atoms; continuing the reaction until the terminal hydroxyls of the copolymer chains have been substantially converted to ester groups and thereafter recovering a chloral-dichloroacetaldehyde copolymer dicarboxylate having a reaction rate constant for thermal degradation at 255° C. of less than 1.6 percent by weight per minute.

22. The process of claim 21 wherein acetic anhydride is used as the esterifying compound and the thermally-stable polymer composition prepared is a chloral-dichloroacetaldehyde copolymer diacetate.

23. The process of claim 21 wherein the thermally-stable chloral-dichloroacetaldehyde copolymer dicarboxylate prepared contains from 40 to 60 mol percent of dichloroacetaldehyde.

24. The process of claim 21 wherein the thermally-stable chloral-dichloroacetaldehyde copolymer dicarboxylate prepared has an average polymer molecular weight of about 45,000.

References Cited by the Examiner

UNITED STATES PATENTS

| | | | |
|---|---|---|---|
| 2,998,409 | 8/1961 | Nogare et al. | 260—67 |
| 3,001,966 | 9/1961 | Funck et al. | 260—67 |

FOREIGN PATENTS

| | | |
|---|---|---|
| 659,089 | 3/1963 | Canada. |
| 876,956 | 9/1961 | Great Britain. |
| 902,602 | 8/1962 | Great Britain. |

OTHER REFERENCES

Staudinger et al.: Helvetica Chimica Acta, vol. 8, 1925, pp. 41–64 (pp. 53–59 relied on).

Novak et al.: Canadian Journal of Chemistry, 37, October 1959, pp. 1722–1726.

Furukawa et al.: Die Makromolekulare Chemie 37, April 1960, pp. 149–152.

Furukawa et al.: Ibid., 44/46, pp. 398–407 (1961).

Vogl: Chemistry and Industry, June 3, 1961, pp. 748–49.

WILLIAM H. SHORT, *Primary Examiner.*

LOUISE P. QUAST, *Examiner.*

L. M. MILLER, *Assistant Examiner.*